(12) United States Patent
Keeler, Jr. et al.

(10) Patent No.: US 7,887,009 B2
(45) Date of Patent: Feb. 15, 2011

(54) METHODS AND SYSTEMS FOR ATTACHING AIRCRAFT WINGS TO FUSELAGES

(75) Inventors: Robert D. Keeler, Jr., Maryland Heights, MO (US); Timothy J. McMahon, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 682 days.

(21) Appl. No.: 11/950,947

(22) Filed: Dec. 5, 2007

(65) Prior Publication Data

US 2009/0146007 A1 Jun. 11, 2009

(51) Int. Cl.
*B64C 1/26* (2006.01)
(52) U.S. Cl. .......................... 244/131; 244/38; 244/119
(58) Field of Classification Search .................. 244/131, 244/38, 39, 72, 22, 46–49, 119, 35 R, 124
See application file for complete search history.

(56) References Cited

U.S. PATENT DOCUMENTS

| | | | |
|---|---|---|---|
| 1,865,964 A * | 7/1932 | Rohrbach ................. 244/45 R |
| 2,001,260 A * | 5/1935 | Martin ....................... 244/119 |
| 2,370,801 A | 3/1945 | Klose |
| 2,412,778 A * | 12/1946 | Kosek ........................ 244/120 |
| 2,749,061 A | 6/1956 | Franz |
| 2,779,558 A * | 1/1957 | Hereil et al. ................ 244/119 |
| 3,018,985 A | 1/1962 | Voigt |
| 4,417,708 A * | 11/1983 | Negri ........................ 244/45 R |
| 7,546,979 B1 * | 6/2009 | Estell et al. ............... 244/123.1 |
| 2009/0283637 A1 * | 11/2009 | Nolla .......................... 244/119 |
| 2010/0200691 A1 * | 8/2010 | Gallant ......................... 244/38 |

* cited by examiner

*Primary Examiner*—Timothy D Collins
*Assistant Examiner*—Brian M. O'Hara
(74) *Attorney, Agent, or Firm*—Perkins Coie LLP

(57) ABSTRACT

Methods and systems for attaching aircraft wings to fuselages are disclosed herein. An aircraft configured in accordance with an embodiment of the invention includes a fuselage and a wing. The wing includes a right wing portion extending outwardly from a right side portion of the fuselage and a left wing portion extending outwardly from a left side portion of the fuselage. In this embodiment, the right wing portion is fixedly attached to the left wing portion by a wing center section extending through at least a portion of the fuselage. The aircraft further includes a first pivotable link structurally attaching the wing center section to the right side portion of the fuselage, and a second pivotable link structurally attaching the wing center section to the left side portion of the fuselage.

16 Claims, 5 Drawing Sheets

METHODS AND SYSTEMS FOR ATTACHING AIRCRAFT WINGS TO FUSELAGES

TECHNICAL FIELD

The following disclosure relates generally to aircraft structures and, more particularly, to aircraft wing-to-fuselage attachments.

BACKGROUND

A major portion of aircraft final assembly flow time is consumed in joining the wing to the fuselage. In conventional jet transport aircraft, the wings are joined to the fuselage by fixed pins which join the front and rear wing spars to major frames of the fuselage. This approach requires drilling and installing hundreds of fasteners and, as a result, is very time consuming.

During taxiing, takeoff, flight and landing, the wing can experience a wide range of loading conditions from lift, drag, air gusts, and the landing gear. These loads cause the wing to flex and bend, which in turn imparts loads and deflections to the fuselage through the wing-to-fuselage attachments. In general, the vertical, side, and fore and aft loads from the wing can be carried by existing fuselage structures. For example, the vertical and side loads can be carried by the fuselage frames, and the fore and aft loads can be carried by the fuselage skin panels. The wing bending loads, however, require additional fuselage frame reinforcement to adequately carry the loads and prevent fuselage distortion. This frame reinforcement is considered "parasitic structure" because it is not required to carry the fuselage loads.

As the foregoing discussion suggests, current methods of joining wings to fuselages in jet transport aircraft can be both time-consuming and costly, with the added downside that the additional fuselage weight reduces aircraft performance and fuel efficiency. Accordingly, new methods and systems for joining aircraft wings to fuselages that require less time and structural reinforcement would be desirable.

SUMMARY

The following summary is provided for the benefit of the reader only, and is not intended to limit the scope of the invention as set forth by the claims in any way.

Aspects of the present disclosure are directed to methods and systems for attaching aircraft wings to fuselages. An aircraft configured in accordance with one aspect of the disclosure includes a wing and a fuselage. The wing has a right wing portion extending outwardly from a right side portion of the fuselage, and a left wing portion extending outwardly from a left side portion of the fuselage. The right wing portion is fixedly attached to the left wing portion by a wing center section extending through at least a portion of the fuselage. The aircraft further includes a first pivotable link structurally attaching the wing center section to the right side portion of the fuselage, and a second pivotable link structurally attaching the wing center section to the left side portion of the fuselage. In one embodiment, the first and second pivotable links structurally attach an upper portion of the wing section to the fuselage, and the aircraft further includes a third pivotable link structurally attaching a bottom portion of the wing center section to a longitudinal keel member of the fuselage.

A method for assembling an aircraft in accordance with another aspect of the disclosure includes constructing a unitary wing having a right wing portion fixedly attached to a left wing portion by a wing center section. The method further includes attaching a first lug to a right side portion of the wing center section and a second lug to a left side portion of the wing center section. The method additionally includes attaching a first link to a right side portion of a fuselage and a second link to a left side portion of the fuselage. The method proceeds by pivotably attaching the wing to the right side portion of the fuselage by inserting a first pin through the first lug and the first link, and pivotably attaching the wing to the left side portion of the fuselage by inserting a second pin through the second lug and the second link. In one embodiment, the first and second lugs are positioned toward an upper portion of the wing center section, and the method further includes attaching a third lug to a lower portion of the wing center section and a third link to a fuselage keel member. In this embodiment, the method also includes installing a fuselage keel member under the wing center section, and pivotably attaching the wing to the fuselage keel member by inserting a third pin through the third lug and the third link.

DETAILED DESCRIPTION

The following disclosure describes various methods and systems for attaching aircraft wings to fuselages in an efficient manner that reduces the wing bending loads carried through the fuselage. As described in greater detail below, in one embodiment a unitary or "one-piece" aircraft wing can be attached to a fuselage by a plurality of pivotable links that swivel when the wing contorts due to bending loads. Certain details are set forth in the following description and in FIGS. 1-7 to provide a thorough understanding of various embodiments of the invention. However, other details describing well-known structures and systems often associated aircraft wings, fuselages and jet transport aircraft structures in general are not set forth below to avoid unnecessarily obscuring the description of various embodiments of the invention.

Many of the details, dimensions, angles and other features shown in the Figures are merely illustrative of particular embodiments of the invention. Accordingly, other embodiments can have other details, dimensions, angles and features without departing from the spirit or scope of the present invention. In addition, those of ordinary skill in the art will appreciate that further embodiments of the invention can be practiced without several of the details described below.

In the Figures, identical reference numbers identify identical or at least generally similar elements. To facilitate the discussion of any particular element, the most significant digit or digits of any reference number refers to the Figure in which that element is first introduced. For example, element 230 is first introduced and discussed with reference to FIG. 2.

Figure 1:
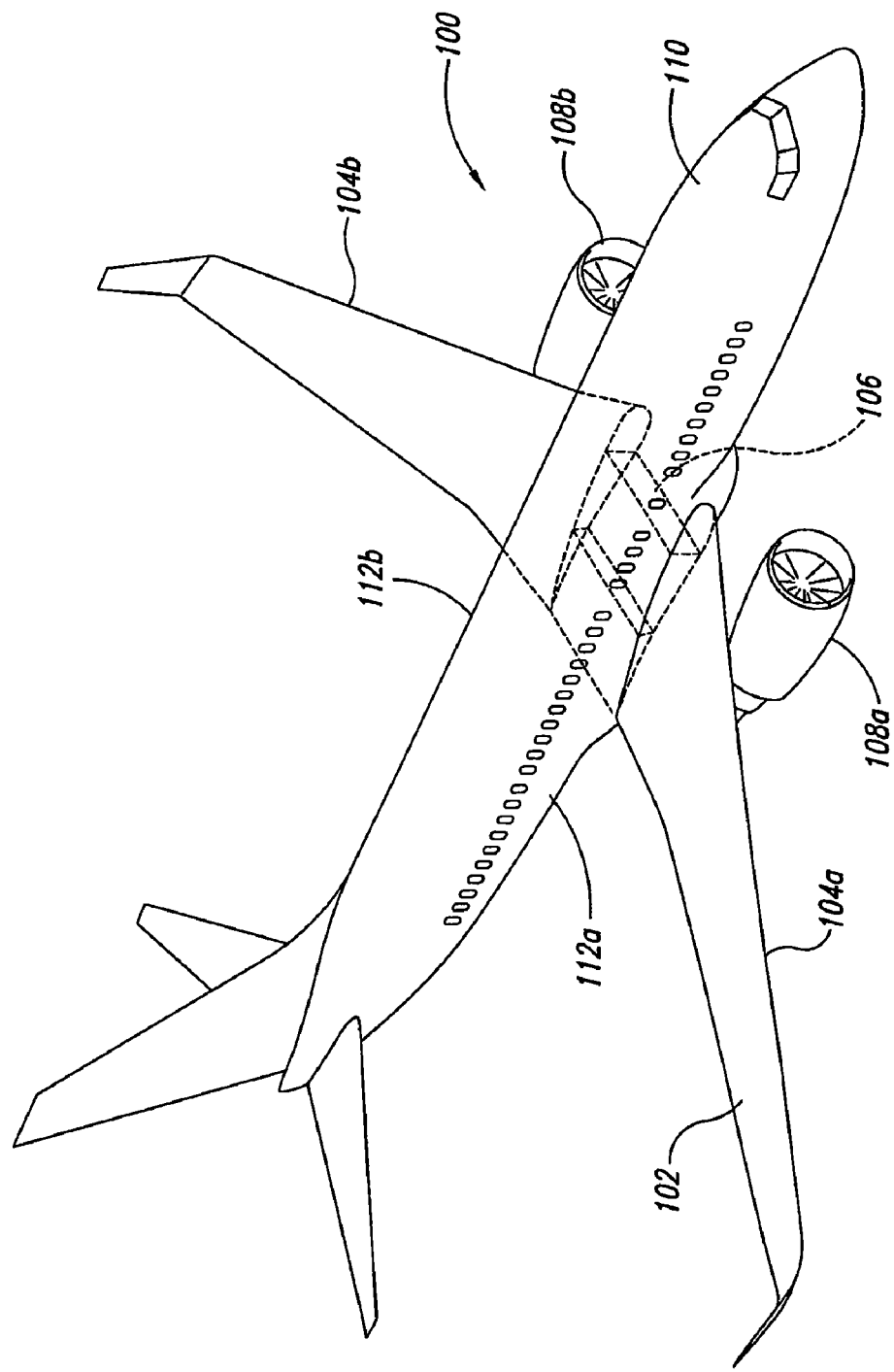
FIG. 1 is a top isometric view of an aircraft having a wing joined to a fuselage in accordance with an embodiment of the invention.

FIG. 1 is a top isometric view of an aircraft 100 having a wing 102 attached to a fuselage 110 in accordance with an embodiment of the invention. The fuselage 110 includes a right fuselage portion 112a and a corresponding left fuselage portion 112b. The wing 102 includes a right wing portion 104a extending outwardly from the right fuselage portion 112a, and a left wing portion 104b extending outwardly from the left fuselage portion 112b. The wing 102 further includes a wing center section 106 extending through at least a portion of the fuselage 110. The wing center section 106 structurally attaches the right wing portion 104a to the left wing portion 104b.

In the illustrated embodiment, the aircraft 100 is a commercial jet transport aircraft having a first jet engine 108a carried by the right wing portion 104a, and a second jet engine 108b carried by the left wing portion 104b. In other embodiments, however, the methods and systems described herein for attaching wings to fuselages can be used on other aircraft, including other commercial and non-commercial jet and non-jet aircraft. For example, other transport aircraft having one or more jet engines mounted to the fuselage.

Figure 2:
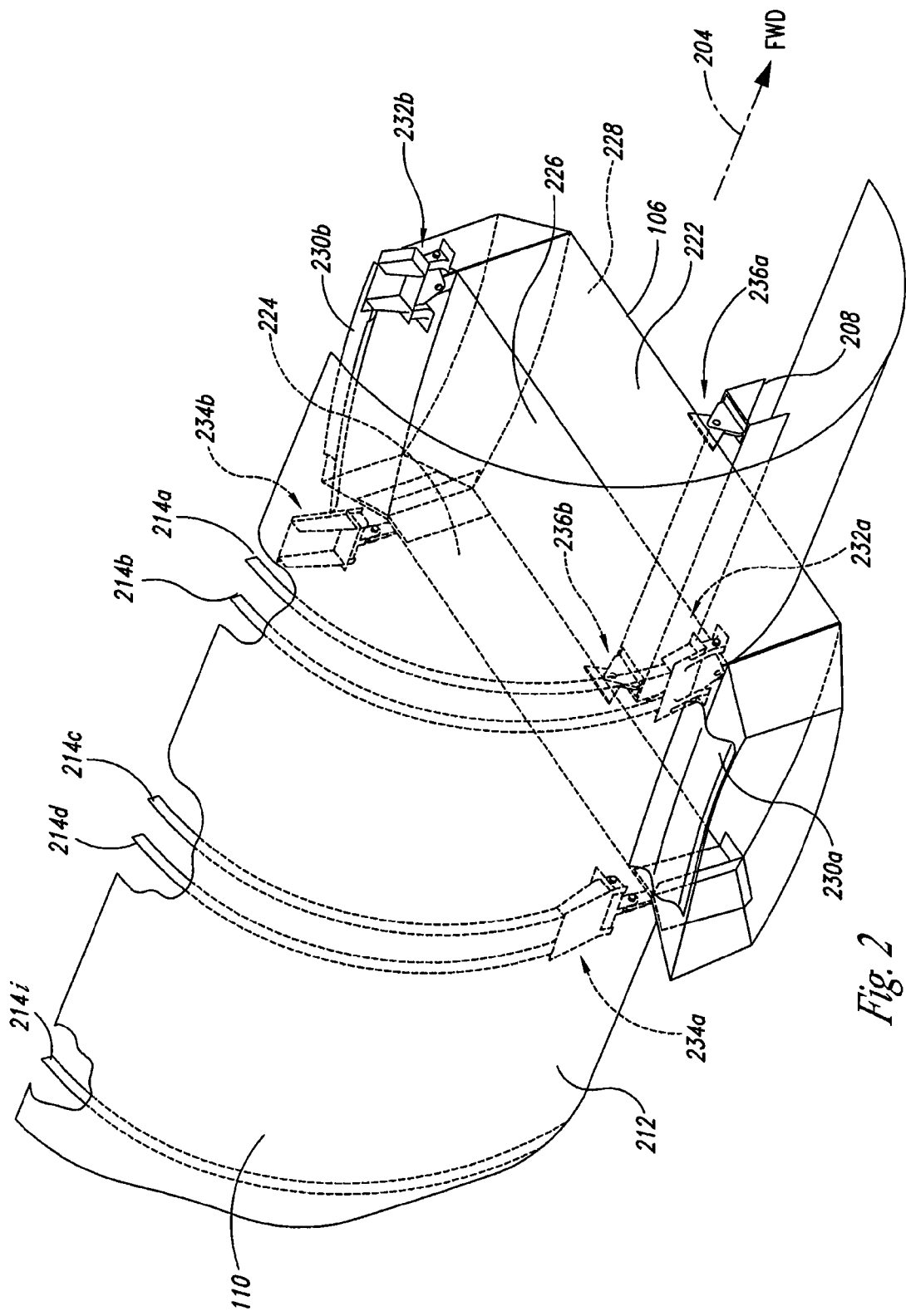
FIG. 2 is an enlarged, partially cutaway isometric view illustrating the wing-to-fuselage junction of FIG. 1 in more detail.

FIG. 2 is an enlarged, partially cutaway isometric view of a portion of the aircraft 100 of FIG. 1, illustrating various aspects of the junction between the wing 102 and the fuselage 110 in more detail. In the illustrated embodiment, the fuselage 110 has a semi-monocoque construction with a plurality of circumferential frames 214 (identified individually as frames 214a-i) covered by a skin 212 in a manner known in the art. The fuselage 110 also includes a lower keel beam 208 aligned with a longitudinal fuselage axis 204.

The wing center section 106 includes a center portion of a front wing spar 222 and a center portion of a rear wing spar 224. Although not shown in FIG. 2, the front wing spar 222 and the rear wing spar 224 each extend at least partially through the right wing portion 104a and the left wing portion 104b (FIG. 1). The center wing section 106 further includes an upper wing skin 226 and a lower wing skin 228. The upper wing skin 226 and the lower wing skin 228 extend at least partially from the front wing spar 222 to the rear wing spar 224 to form what is often referred to in the art as a wing "box section" or "torque box."

In one aspect of this embodiment, the wing center section 106 is structurally attached to the fuselage 110 by a plurality of pin attachments that transfer both vertical and side loads from the wing 102 into the fuselage 110, while transferring most of the wing bending loads through the wing center section 106. In the illustrated embodiment, the pin attachments include four pin joints located at each of the four corners of the wing center section 106 adjacent to an upper portion of the wing center section 106. These pin joints are identified individually as a first forward pin joint 232a, a second forward pin joint 232b, a first aft pin joint 234a, and a second aft pin joint 234b. As described in greater detail below, the first and second forward pin joints 232 attach a forward portion of the wing center section 106 to one or more forward fuselage frames 214 (e.g., the fuselage frames 214a and 214b). The first and second aft pin joints 234 attach an aft portion of the wing center section 106 to one or more aft fuselage frames 214 (e.g., the fuselage frames 214c and 214d).

In addition, there are two central pin attachments located along a centerline of the wing center section 106 adjacent to a lower portion of the wing center section 106. These pin attachments are identified individually as a first central pin joint 236a and a second central pin joint 236b. The first and second central pin joints 236 attach the wing center section 106 to the fuselage keel beam 208.

In another aspect of this embodiment, the wing center section 106 is also attached to the fuselage 110 by a first shear tie 230a and a corresponding second shear tie 230b. In the illustrated embodiment, the first shear tie 230a extends between the upper wing skin 226 and the fuselage skin 212 on the right fuselage portion 112a, and the second shear tie 230b extends between the upper wing skin 226 and the fuselage skin 212 on the left fuselage portion 112b. As described in greater detail below, the shear ties 230 enable the wing 102 to transfer fore and aft shear loads into the fuselage 110 without transferring bending loads into the fuselage 110.

Figure 3:
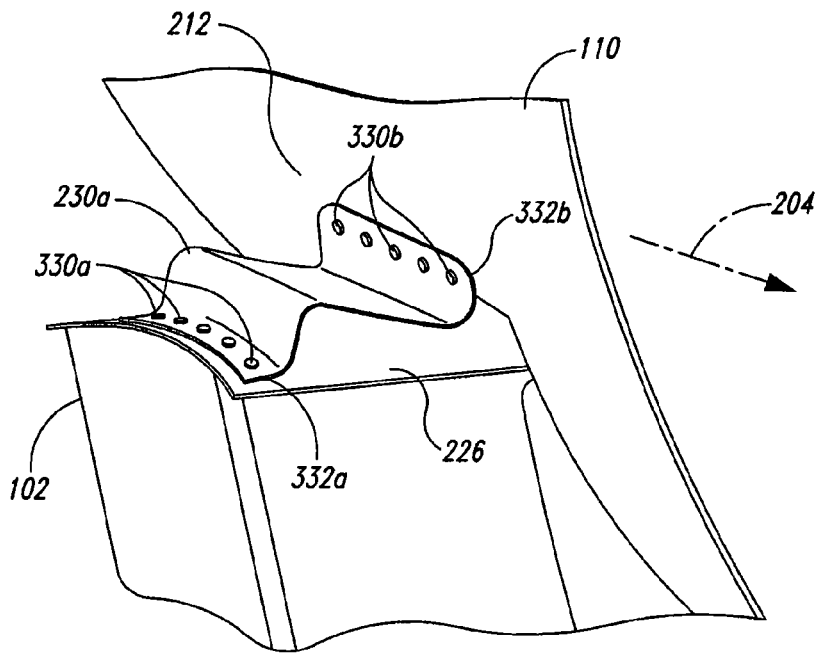
FIG. 3 is an enlarged isometric view illustrating a wing-to-fuselage shear tie configured in accordance with an embodiment of the invention.

FIG. 3 is an enlarged isometric view of a portion of the wing-to-fuselage junction of FIG. 2, illustrating the installation of the shear tie 230a in more detail. In one aspect of this embodiment, the shear tie 230a can be made from a bendable material that is partially pre-buckled or pre-folded about one or more axes that are at least generally parallel to the longitudinal axis 204. The shear tie 230a can be manufactured from suitable materials that cannot transfer bending loads from the wing 102 to the fuselage 110, but can transfer shear loads from the wing 102 to the fuselage 110. Such materials can include, for example, metallic sheet materials, e.g., aluminum, steel, titanium, etc. Such materials can also include fiber-reinforced resin materials, such as graphite/epoxy materials and other suitable composites.

In the illustrated embodiment, the shear tie 230a includes a first edge portion 332a fixedly attached to the wing upper skin 226, and a second edge portion 332b fixedly attached to the fuselage skin 212. The first and second edge portions 332 are attached to the adjacent skin structures with a plurality of fasteners 330 (identified individually as first fasteners 330a and second fasteners 330b). In other embodiments, the edge portions 332 of the shear tie 230a can be bonded to the wing upper skin 226 and the fuselage skin 212 with a suitable adhesive, by welding, and/or by other means. After final installation, the shear tie 230a can be covered by a suitable wing-to-body fairing.

Figure 4:
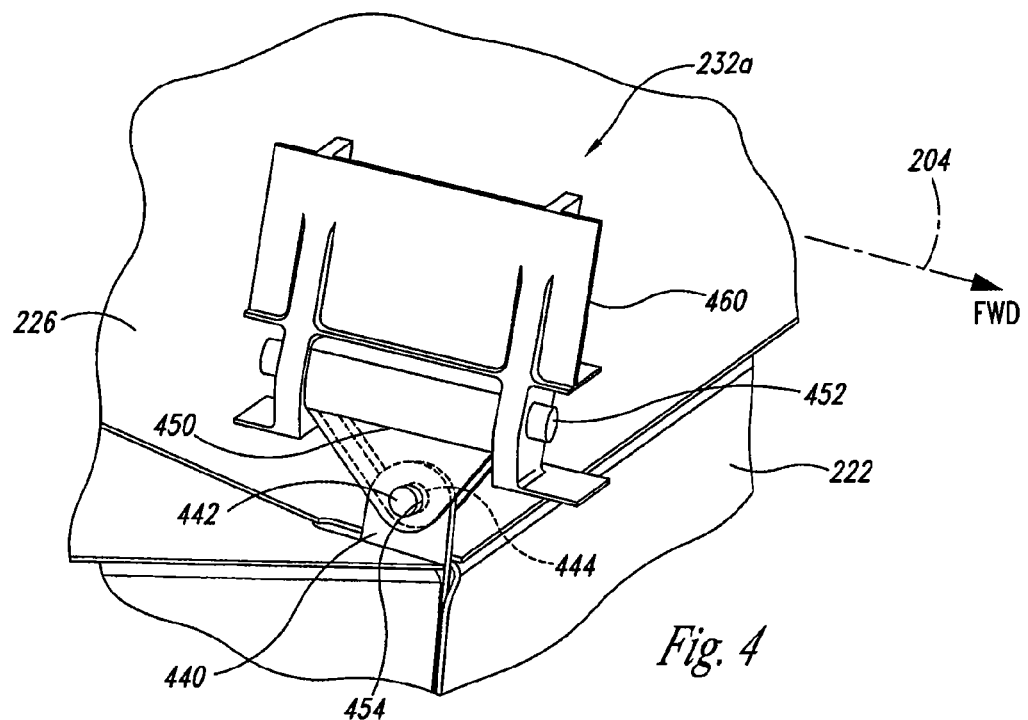
FIG. 4 is an enlarged isometric view of a forward wing-to-fuselage pin joint configured in accordance with an embodiment of the invention.

FIG. 4 is an enlarged isometric view of the first forward pin joint 232a of FIG. 2, configured in accordance with an embodiment of the invention. The forward pin joint 232a includes a forward wing lug 440 fixedly attached to the wing center section 106 proximate the forward wing spar 222. The forward wing lug 440 projects above the upper wing skin 226 and includes a lug bore 444.

In another aspect of this embodiment, the forward pin joint 232a also includes a forward swivel link 450 and a forward frame fitting 460. The frame fitting 460 is fixedly attached to one or more of the fuselage frames 214 (FIG. 2). The swivel link 450 is pivotally attached to the frame fitting 460 by a link pin 452. In the illustrated embodiment, the link pin 452 is oriented parallel to the fuselage longitudinal axis 204. The swivel link 460 includes a link bore 454.

To structurally attach the wing center section 106 to the frame fitting 460, the link bore 454 is aligned with the lug bore 440, and a lug pin 442 is inserted through the respective bores. The lug pin 442 can be retained in the lug bore 440 using any suitable means known in the art such as a nut, lock pin, etc. The link pin 452 enables the swivel link 450 to pivot with respect to the frame fitting 460 to accommodate slight inboard/outboard movement of the wing lug 440 perpendicular to the fuselage longitudinal axis 204. The lug bore 444 can include a spherical bearing (not shown) to accommodate rotation of the swivel link 450 during this movement. The second forward pin joint 232b (FIG. 2) can be at least generally similar in structure and function to the first forward pin joint 232a described above with reference to FIG. 4, except that the second forward pin joint 232b can be a mirror image of the first forward pin joint 232a.

Figure 5:
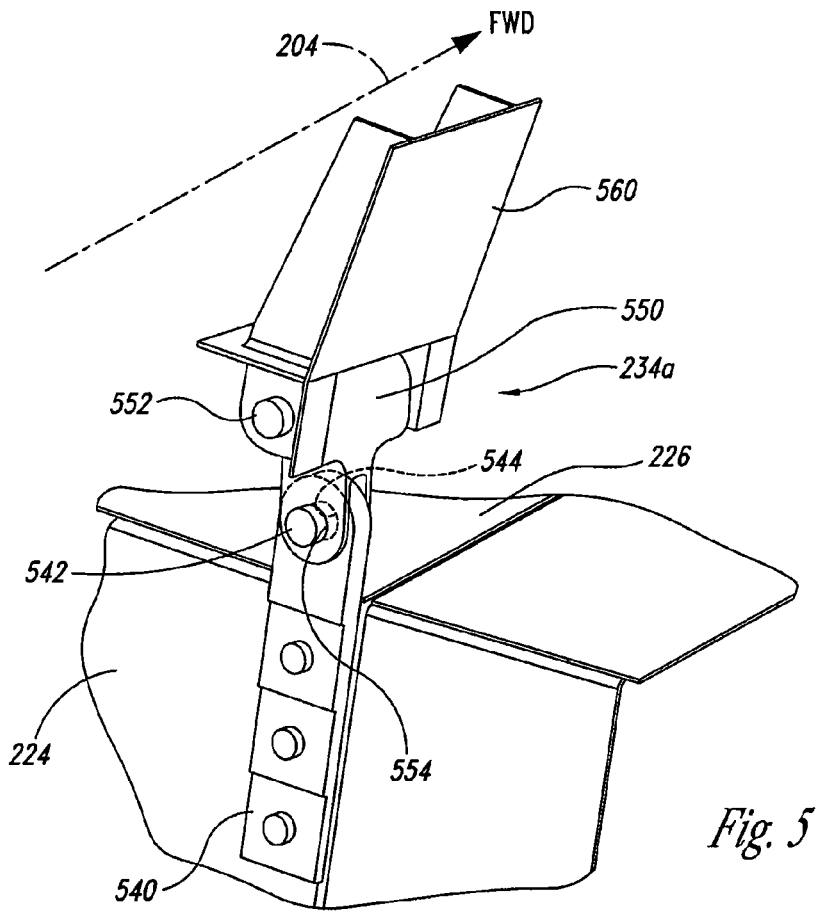
FIG. 5 is an enlarged isometric view of an aft wing-to-fuselage pin joint configured in accordance with another embodiment of the invention.

FIG. 5 is an enlarged isometric view of the first aft pin joint 234a of FIG. 2, configured in accordance with an embodiment of the invention. The aft pin joint 234a includes an aft wing lug 540 fixedly attached to the wing center section 106 proximate to the rear wing spar 224. The aft wing lug 540 projects above the upper wing skin 226 and includes a lug bore 544.

In another aspect of this embodiment, the aft pin joint 234a includes a swivel link 550 and an aft frame fitting 560. The frame fitting 560 is fixedly attached to one or more of the fuselage frames 214 (FIG. 2). The swivel link 550 is pivotally attached to the frame fitting 560 by a link pin 552. In the illustrated embodiment, the link pin 552 is oriented parallel to the fuselage longitudinal axis 204.

The aft wing lug 540 is pivotally attached to the swivel link 550 by a lug pin 542 that extends through the link bore 554 and the adjacent lug bore 544. The link pin 552 enables the swivel link 550 to pivot with respect to the frame fitting 560 to accommodate slight inboard/outboard movement of the wing lug 540 perpendicular to the fuselage longitudinal axis 204. The second aft pin joint 234b (FIG. 2) can be at least generally similar in structure and function to the first aft pin joint 234a described above with reference to FIG. 5, except that the second aft pin joint 234b can be a mirror image of the first aft pin joint 234a.

Figure 6:
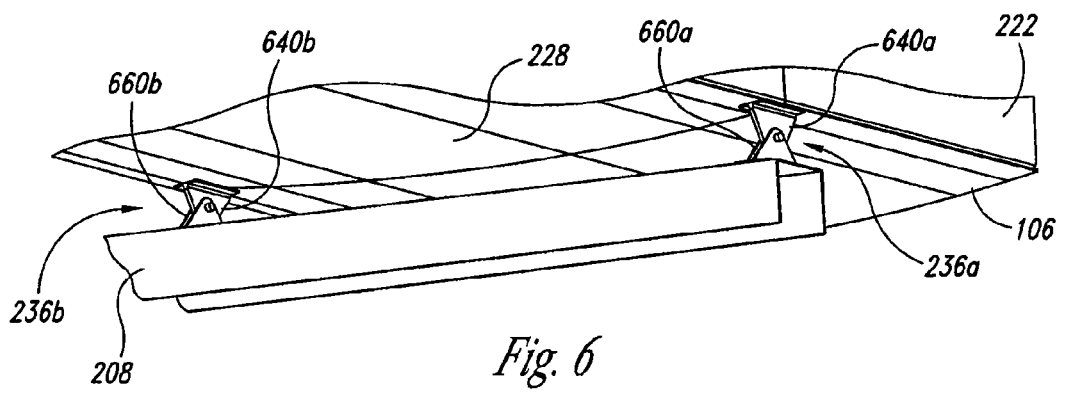
FIG. 6 is an enlarged isometric view of a wing-to-fuselage keel beam junction configured in accordance with an embodiment of the invention.

FIG. 6 is an enlarged isometric view looking upwardly at the wing center section 106 of FIG. 2, illustrating various aspects of the first central pin joint 236a and the second central pin joint 236b in more detail. A first central wing lug 640a is fixedly attached to the underside of the wing center section 106 proximate the center of the front wing spar 222. A second central wing lug 640b is fixedly attached to the underside of the wing center section 106 proximate the center of the rear wing spar 224 (FIG. 2). A first keel fitting 660a is fixedly attached to the fuselage keel beam 208 adjacent to the first central wing lug 640a, and a second keel fitting 660b is fixedly attached to the fuselage keel beam 208 adjacent to the second central wing lug 640b.

Figure 7:
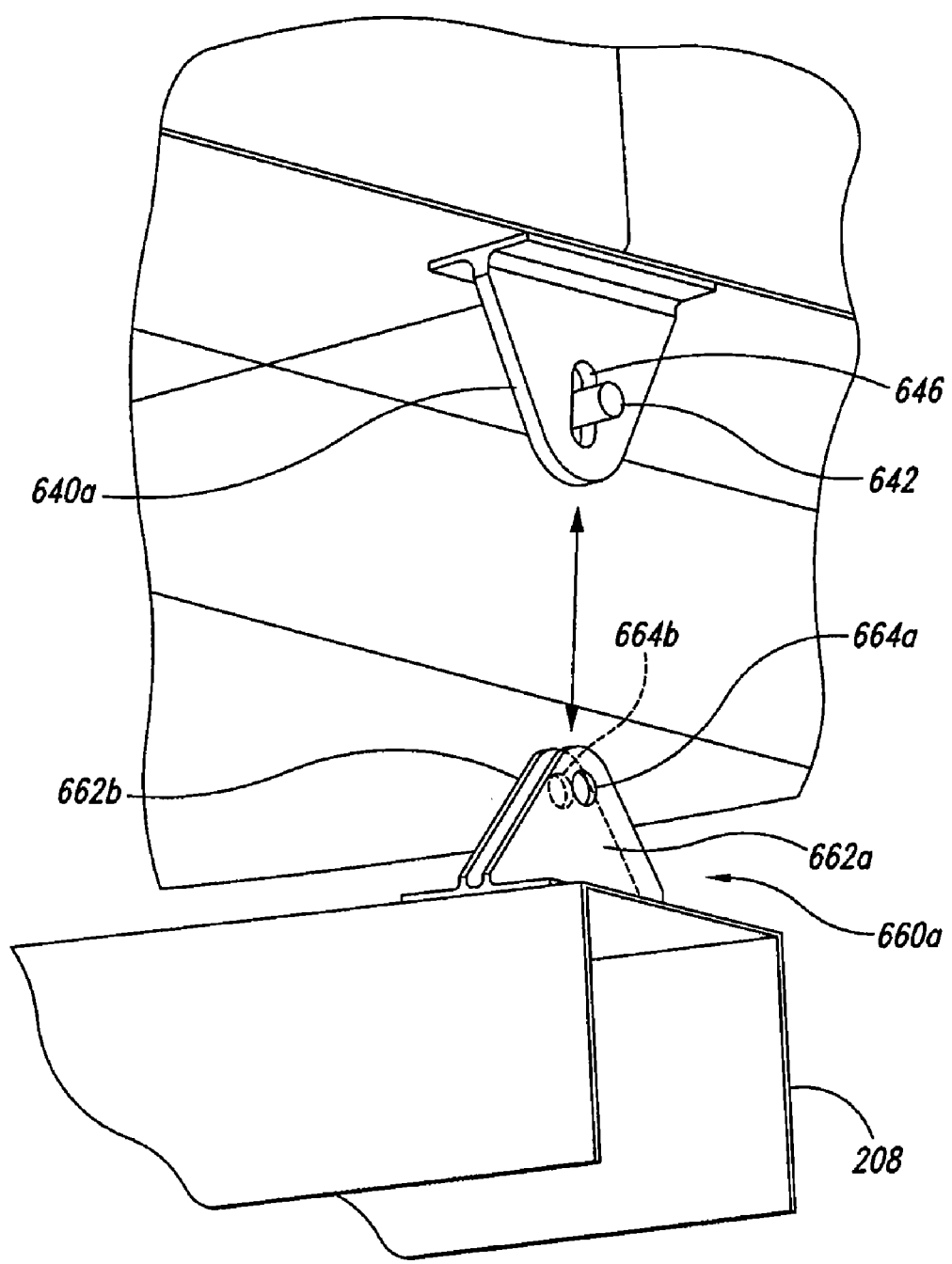
FIG. 7 is a partially exploded, enlarged isometric view of a wing-to-keel beam pin joint configured in accordance with an embodiment of the invention.

FIG. 7 is a partially exploded, enlarged isometric view of the first central pin joint 236a. As this view illustrates, the forward keel fitting 660a of the illustrated embodiment is a clevis fitting having a first flange 662a spaced apart from the second flange 662b. Each of the fitting flanges 662 includes a corresponding fitting bore 664 (identified individually as a first fitting bore 664a and a second fitting bore 664b) extending therethrough. The first central wing lug 640a includes a slotted hole or bore 646. To join the fuselage keel beam 208 to the wing center section 106, the first center wing lug 640a is inserted into the first clevis fitting 660a, and a lug pin 642 is inserted through the fitting bores 664 and the slotted bore 646. As illustrated in FIG. 7, the slotted bore 646 is an elongate hole that will accommodate vertical movement between the first keel fitting 660a and the first central wing lug 640a, but will restrict side-to-side movement. The second central pin joint 236b can be at least generally similar in structure and function to the first central pin joint 236a. For example, in one embodiment, the second central pin joint 236b can be identical, or at least generally identical, to the first central pin joint 236a. In other embodiments, the second central pin joint 236b can have different configurations, or can be omitted.

The wing-to-fuselage attachment system described in detail above with reference to FIGS. 1-7 can reduce the amount of time it takes to attach the wing 102 to the fuselage 110 during assembly of the aircraft 100. For example, in one embodiment, the swivel links 450 and 550 can pivotally attached to the corresponding fuselage frame fittings 460 and 560 with the link pins 452 and 552 prior to installation of the wing 102. The right wing portion 104a, the left wing portion 104b, and the wing center section 106 can be manufactured as a unitary or one-piece wing, and then moved into position so that the wing lugs 440 and 540 are positioned adjacent to the corresponding frame fittings 460 and 560 (FIG. 4 and FIG. 5). Once the wing center section 106 is in position and the bores and the wing lugs 440 and 540 are aligned with the corresponding bores in the swivel links 450 and 550, the corresponding lug pins 442 and 542 can be inserted through the bores to pivotally join the individual wing lugs to the corresponding swivel links. Next, the fuselage keel beam 208 can be moved into position beneath the wing 102 and joined to the first and second central wing lugs 640a and 640b (FIGS. 6 and 7).

One advantage of the assembly method described above is that the wing 102 can be attached to the fuselage 110 in less time than is typically required for conventional methods wherein the right and left wing sections are attached independently. A further advantage of this configuration is that the wing 102 does not transmit significant bending loads into the fuselage 110. As a result, fuselage deflections are reduced, and the fuselage 110 does not require additional structural reinforcement to carry these bending loads.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

We claim:

1. An aircraft comprising:
   a fuselage having a right side portion opposite a left side portion;
   a wing having a right wing portion extending outwardly from the right side portion of the fuselage and a left wing portion extending outwardly from the left side portion of the fuselage, wherein the right wing portion is fixedly attached to the left wing portion by a wing center section extending through at least a portion of the fuselage;
   a first pivotable link structurally attaching an upper portion of the wing center section to the right side portion of the fuselage;
   a second pivotable link structurally attaching the upper portion of the wing center section to the left side portion of the fuselage; and
   a third pivotable link structurally attaching a bottom portion of the wing center section to a longitudinal keel member of the fuselage.

2. The aircraft of claim 1 wherein the wing center section includes a box section formed from a front wing spar and a rear wing spar, and wherein the first and second pivotable links are positioned proximate to the front wing spar.

3. The aircraft of claim 1 wherein the wing center section includes a box section formed from a front wing spar, a rear wing spar, and an upper wing skin extending at least partially between the front and rear spars, wherein the first and second pivotable links are positioned proximate to the front wing spar and the upper wing skin.

4. The aircraft of claim 1 wherein the wing center section includes a wing skin extending at least partially between a front wing spar and a rear wing spar, and wherein the aircraft further comprises:
 a first shear tie attaching a first portion of the wing skin to the right side portion of the fuselage; and
 a second shear tie attaching a second portion of the wing skin to the left side portion of the fuselage.

5. The aircraft of claim 1 wherein the first pivotable link includes a first link bore and the second pivotable link includes a second link bore, and wherein the aircraft further comprises:
 a first lug fixedly attached to the wing center section, the first lug having a first lug bore;
 a second lug fixedly attached to the wing center section and spaced apart from the first lug, the second lug having a second lug bore;
 a first pin extending through the first link bore and the first lug bore to pivotally attach the wing center section to the right side portion of the fuselage; and
 a second pin extending through the second link bore and the second lug bore to pivotally attach the wing center section to the left side portion of the fuselage.

6. The aircraft of claim 1 wherein the first pivotable link is pivotally attached to a first fuselage frame fitting and includes a first link bore, wherein the second pivotable link is pivotally attached to a second fuselage frame fitting and includes a second link bore, and wherein the aircraft further comprises:
 a first lug fixedly attached to the wing center section, the first lug having a first lug bore;
 a second lug fixedly attached to the wing center section and spaced apart from the first lug, the second lug having a second lug bore;
 a first pin extending through the first link bore and the first lug bore to pivotally attach the wing center section to the right side portion of the fuselage; and
 a second pin extending through the second link bore and the second lug bore to pivotally attach the wing center section to the left side portion of the fuselage.

7. The aircraft of claim 1 wherein the wing center section includes a center portion of a front wing spar and a center portion of a rear wing spar, wherein the first pivotable link includes a first link bore and the second pivotable link includes a second link bore, and wherein the aircraft further comprises:
 a first lug fixedly attached to the wing center section proximate the front wing spar, the first lug having a first lug bore;
 a second lug fixedly attached to the wing center section proximate the front wing spar, the second lug having a second lug bore;
 a first pin extending through the first link bore and the first lug bore to pivotally attach the wing center section to the right side portion of the fuselage;
 a second pin extending through the second link bore and the second lug bore to pivotally attach the wing center section to the left side portion of the fuselage;
 a third lug fixedly attached to the wing center section proximate the rear wing spar, the third lug having a third lug bore;
 a fourth lug fixedly attached to the wing center section proximate the rear wing spar, the fourth lug having a fourth lug bore;
 a third pin extending through the third lug bore and a third link bore to pivotally attach the wing center section to the right side portion of the fuselage; and
 a fourth pin extending through the fourth lug bore and a fourth link bore to pivotally attach the wing center section to the left side portion of the fuselage.

8. The aircraft of claim 1 wherein the third pivotable link comprises:
 a lug fixedly attached to a lower portion of the wing center section, the lug having a lug bore;
 a fitting fixedly attached to the longitudinal keel member of the fuselage, the fitting having a fitting bore;
 and a pin extending through the lug bore and the fitting bore to pivotally attach the wing center section to the longitudinal keel member.

9. The aircraft of claim 8 wherein at least one of the lug bore and the fitting bore is slotted to allow vertical movement of one of the lug and the fitting relative to the other of the lug and the fitting.

10. An aircraft comprising:
 a fuselage having a right side portion opposite a left side portion;
 a unitary wing assembly having a right wing portion extending outwardly from the right side portion of the fuselage and a left wing portion extending outwardly from the left side portion of the fuselage, wherein the right wing portion is structurally attached to the left wing portion by a wing center section extending through at least a portion of the fuselage, wherein the wing center section includes a center portion of a front wing spar and a center portion of a rear wing spar;
 a first pivotable link pivotally attaching an upper portion of the wing center section to the right side portion of the fuselage proximate the front wing spar;
 a second pivotable link pivotally attaching the upper portion of the wing center section to the left side portion of the fuselage proximate the front wing spar;
 a third pivotable link pivotally attaching the upper portion of the wing center section to the right side portion of the fuselage proximate the rear wing spar;
 a fourth pivotable link pivotally attaching the upper portion of the wing center section to the left side portion of the fuselage proximate the rear wing spar; and
 a fifth pivotable link structurally attaching a bottom portion of the wing center section to a longitudinal keel member of the fuselage.

11. The aircraft of claim 10 wherein the wing center section includes an upper wing skin extending at least partially between the front and rear wing spars, wherein the first and second pivotable links are positioned proximate the upper wing skin and the front wing spar, and wherein the third and fourth pivotable links are positioned proximate the upper wing skin and the rear wing spar.

12. The aircraft of claim 10 wherein the wing center section includes an upper wing skin extending at least partially between the front and rear wing spars, and wherein the aircraft further comprises:
 a first shear tie attaching the upper wing skin to the right side portion of the fuselage, wherein the first shear tie is configured to transfer shear loads from the right wing portion to the fuselage without transferring bending loads from the right wing portion to the fuselage; and
 a second shear tie attaching the upper wing skin to the left side portion of the fuselage, wherein the second shear tie is configured to transfer shear loads from the left wing portion to the fuselage without transferring bending loads from the left wing portion to the fuselage.

13. The aircraft of claim 10 wherein the first pivotable link includes a first link bore and the second pivotable link includes a second link bore, and wherein the aircraft further comprises:
- a first lug fixedly attached to the wing center section, the first lug having a first lug bore;
- a second lug fixedly attached to the wing center section and spaced apart from the first lug, the second lug having a second lug bore;
- a first pin extending through the first link bore and the first lug bore to pivotally attach the wing center section to the right side portion of the fuselage; and
- a second pin extending through the second link bore and the second lug bore to pivotally attach the wing center section to the left side portion of the fuselage.

14. A method for assembling a jet transport aircraft, the method comprising:
- constructing a fuselage;
- attaching a first link to a right side portion of the fuselage;
- attaching a second link to a left side portion of the fuselage;
- constructing a unitary wing having a right wing portion fixedly attached to a left wing portion by a wing center section;
- installing a fuselage keel member under the wing center section;
- attaching a first lug to an upper right side portion of the wing center section;
- attaching a second lug to an upper left side portion of the wing center section;
- pivotally attaching the wing to the right side portion of the fuselage by inserting a first pin through the first lug and the first link;
- pivotally attaching the wing to the left side portion of the fuselage by inserting a second pin through the second lug and the second link; and
- pivotally attaching a lower portion of the wing center section to the fuselage keel member.

15. The method of claim 14:
- wherein attaching the first link to the right side portion of the fuselage includes pivotally attaching the first link to the right side portion of the fuselage;
- wherein attaching the second link to the left side portion of the fuselage includes pivotally attaching the second link to the left side portion of the fuselage;
- wherein attaching the first lug to the right side portion of the wing center section includes fixedly attaching the first lug to the right side portion of the wing center section; and
- wherein attaching the second lug to the left side portion of the wing center section includes fixedly attaching the second lug to the left side portion of the wing center section.

16. The method of claim 14 wherein attaching a lower portion of the wing center section to the fuselage keel member includes:
- attaching a third lug to a lower portion of the wing center section;
- attaching a third link to the fuselage keel member;
- installing the fuselage keel member under the wing center section;
- and pivotally attaching the wing to the fuselage keel member by inserting a third pin through the third lug and the third link.

* * * * *